US012596067B2

(12) United States Patent
Muller et al.

(10) Patent No.: US 12,596,067 B2
(45) Date of Patent: Apr. 7, 2026

(54) COMPACT HIGH RESOLUTION MONOCHROMATIC LIGHT SOURCE FOR FLUID SAMPLE CONCENTRATION MEASUREMENT

(71) Applicant: Repligen Corporation, Waltham, MA (US)

(72) Inventors: Matthew Muller, Cranford, NJ (US); Richard Hall, III, Bernardsville, NJ (US); Yusheng Zhang, Stewartsville, NJ (US); Peter Halatin, Howell, NJ (US)

(73) Assignee: Repligen Corporation, Waltham, MA (US)

( * ) Notice: Subject to any disclaimer, the term of this patent is extended or adjusted under 35 U.S.C. 154(b) by 200 days.

(21) Appl. No.: 18/198,523

(22) Filed: May 17, 2023

(65) Prior Publication Data

US 2023/0400405 A1 Dec. 14, 2023

Related U.S. Application Data

(60) Provisional application No. 63/343,361, filed on May 18, 2022.

(51) Int. Cl.
*G01N 21/25* (2006.01)
*G01J 3/10* (2006.01)
(Continued)

(52) U.S. Cl.
CPC .............. *G01N 21/255* (2013.01); *G01J 3/10* (2013.01); *G01J 3/42* (2013.01); *G01N 21/3103* (2013.01)

(58) Field of Classification Search
CPC .. G01N 21/255; G01N 21/3103; G01N 21/33; G01N 2021/0307; G01N 2201/08;
(Continued)

(56) References Cited

U.S. PATENT DOCUMENTS 4,634,277 A 1/1987 Stockdale
6,704,109 B2 3/2004 Wu
(Continued)

FOREIGN PATENT DOCUMENTS

AU 2011214172 A1 8/2012
AU 2013205020 A1 5/2013
(Continued)

OTHER PUBLICATIONS

International Search Report and Written Opinion for the International Application No. PCT/US2023/022572, mailed Aug. 3, 2023, 12 pages.
(Continued)

*Primary Examiner* — Tarifur R Chowdhury
*Assistant Examiner* — Akbar H. Rizvi
(74) *Attorney, Agent, or Firm* — KDW Firm PLLC

(57) ABSTRACT

A compact light source for coupling to a movable optic probe may include a light emitting diode (LED), to generate a probe signal at a first bandwidth, an optic coupler, disposed adjacent to the LED, and arranged to couple the probe signal into the movable probe, and a narrow bandpass filter disposed to receive the probe signal at the first bandwidth, and to output the probe signal into the movable probe at a second bandwidth, less than the first bandwidth.

17 Claims, 4 Drawing Sheets

(51) Int. Cl.
*G01J 3/42* (2006.01)
*G01N 21/31* (2006.01)

(58) Field of Classification Search
CPC .............. G01N 21/0303; G01N 21/31; G01N 2201/0627; G01N 21/8507; G01J 3/10; G01J 3/42
See application file for complete search history.

(56) References Cited

U.S. PATENT DOCUMENTS

| | | | |
|---|---|---|---|
| 6,879,741 B2 | 4/2005 | Salerno | |
| 7,759,651 B2 | 7/2010 | Knight et al. | |
| 7,808,641 B2 | 10/2010 | Salerno | |
| 7,980,745 B2 | 7/2011 | Shanbaky | |
| 9,404,851 B2 | 8/2016 | Shih | |
| 9,952,350 B1 | 4/2018 | DiFoggio | |
| 10,830,778 B2 | 11/2020 | Salerno | |
| 11,300,447 B2 | 4/2022 | Shih | |
| 2011/0108719 A1* | 5/2011 | Ford | G01J 3/02 |
| | | | 250/262 |
| 2013/0215412 A1 | 8/2013 | Wynn | |
| 2013/0237896 A1* | 9/2013 | Meibaum | A61M 1/3612 |
| | | | 604/5.04 |
| 2015/0098082 A1* | 4/2015 | Wang | G01B 9/02057 |
| | | | 356/402 |
| 2015/0244145 A1 | 8/2015 | Taubman et al. | |
| 2015/0268095 A1 | 9/2015 | Kovacich et al. | |
| 2017/0356848 A1 | 12/2017 | Ehring | |
| 2019/0212258 A1 | 7/2019 | Harrison | |
| 2020/0003940 A1* | 1/2020 | Smith | G01J 3/0256 |
| 2021/0096128 A1* | 4/2021 | Peyser | C07K 1/22 |
| 2022/0026160 A1 | 1/2022 | Perreault | |
| 2022/0026272 A1 | 1/2022 | Shih | |
| 2022/0042969 A1 | 2/2022 | Harrison | |
| 2022/0268628 A1 | 8/2022 | Gantier | |
| 2022/0397581 A1 | 12/2022 | Ando et al. | |
| 2023/0002801 A1 | 1/2023 | Dutta | |
| 2023/0111094 A1 | 4/2023 | Matsui et al. | |
| 2023/0251190 A1* | 8/2023 | Prater | G01J 3/0248 |
| | | | 250/339.08 |

FOREIGN PATENT DOCUMENTS

| | | |
|---|---|---|
| CN | 113777334 A | 12/2021 |
| JP | H02196946 A | 8/1990 |
| JP | H04335139 A | 11/1992 |
| JP | H063266 A | 1/1994 |
| JP | H10185686 A | 7/1998 |
| JP | 2004251640 A | 9/2004 |
| JP | 2009180665 A | 8/2009 |
| JP | 2010190885 A | 9/2010 |
| JP | 2017156105 A | 9/2017 |
| JP | 2018139952 A | 9/2018 |
| JP | 2019510213 A | 4/2019 |
| JP | 2019120703 A | 7/2019 |
| WO | 2017144719 A1 | 8/2017 |
| WO | 2021110877 A1 | 6/2021 |

OTHER PUBLICATIONS

International Search Report and Written Opinion for the International Application No. PCT/US2023/022571, mailed Aug. 3, 2023, 13 pages.
International Search Report and Written Opinion for the International Application No. PCT/US2023/022577, mailed Aug. 8, 2023, 14 pages.
The International Preliminary Report on Patentability mailed Nov. 28, 2024, for corresponding PCT/US2023/022571 (seven (7) pages.
Marcus et al., "Optical path length and absorption cross section optimization for high sensitivity ozone concentration measurement," Sensors and Actuators B: Chemical, vol. 221, 2015, pp. 570-575.

* cited by examiner

COMPACT HIGH RESOLUTION MONOCHROMATIC LIGHT SOURCE FOR FLUID SAMPLE CONCENTRATION MEASUREMENT

CROSS-REFERENCE TO RELATED APPLICATIONS

The present application claims the benefit of priority under 35 U.S.C. § 119 to U.S. Provisional Application Ser. No. 63/343,361, entitled "COMPACT HIGH RESOLUTION MONOCHROMATIC LIGHT SOURCE FOR FLUID SAMPLE CONCENTRATION MEASUREMENT" filed on May 18, 2022, the disclosure of which is incorporated herein by reference in its entirety.

BACKGROUND OF THE DISCLOSURE

Field of the Disclosure

Embodiments of the disclosure relate generally to spectroscopic analysis, and more particularly to solution analysis using light source coupled with a variable path length measurement system.

Discussion of Related Art

Absorption spectroscopy is used to measure composition and/or properties of a material in any phase, gas, liquid, solid. For example, the optical absorption spectra of liquid substances may be measured to determine concentration or other properties of a species of interest, within a liquid medium. An absorption spectra may provide the distribution of light attenuation (due to absorbance) as a function of light wavelength. In a known spectrophotometer the sample substance to be studied is placed in a transparent container, so that electromagnetic radiation (light) of a known wavelength, $\lambda$, (i.e. ultraviolet, infrared, visible, etc.) and intensity I may be measured after passing through the transparent container, using a suitable detector.

Known ultraviolet (UV)/visible spectrophotometers utilize containers such as standard cuvettes which containers may have a standard cm path length through which the incident light is conducted within the liquid containing the substance to be measured. For a sample consisting of a single homogeneous substance having a concentration c, the light transmitted through the sample will follow a relationship know as Beer's Law: $A=\varepsilon CL$ where A is the absorbance (also known as the optical density (OD) of the sample at wavelength $\lambda$ where OD=the –log of the ratio of transmitted light to the incident light), $\varepsilon$ is the absorptivity or extinction coefficient (normally at constant at a given wavelength), C is the concentration of the sample, and L is the path length of light through the sample. Thus, in principle, information regarding concentration of the homogenous substance may be determined based upon recorded light intensity of a signal passing through the sample container. However, under some circumstances, the determination of concentration in such apparatus may be difficult. Often, a compound of interest in solution is highly concentrated. For example, certain biological samples, such as proteins, DNA or RNA are often isolated in concentrations that fall outside the linear range of the spectrophotometer when absorbance is measured. Therefore, dilution of the sample is often required to measure an absorbance value that falls within the linear range of the instrument. Frequently multiple dilutions of the sample are required, which leads to both dilution errors and the removal of the sample diluted for an downstream application. It is therefore useful to take existing samples without knowledge of the possible concentration and to measure the absorption of these samples without dilution. One resulting feature common to these known ultraviolet (UV)/visible spectrophotometers is that the path length L be known with great accuracy so that an accurate concentration measurement can be made.

To address these challenges, a measurement technology based upon a variable path length spectrophotometer has recently been developed. This type of spectroscopy system may generally employ a known light source, such as a source based upon a UV/visible spectrophotometer. Light from the UV/visible spectrophotometer is then directed to a special probe in an analysis instrument that is arranged to change the path length L in a special sample chamber to facilitate performing a plurality of absorbance measurements. Thus, in a series of measurements, radiation that is generated from the UV/visible spectrophotometer source is detected after passing through the sample chamber, while the probe is moved through multiple different positions to vary the path length L As such, a series of measurements are produced that generate a different value of A for each different value of L, in a manner that does not require knowledge of any particular path length L, in order to determine the concentration C.

While such variable path length spectroscopy may be adapted for in-line measurements of a sample, while conducted through a production system, for example, the instrumentation required for such measurement scenarios may require extensive installation effort and an undue amount of space. For example, a UV/visible photospectrometer system used as a light source may occupy several cubic feet of space and may have a weight on the order of several tens of kilograms. As such, the placement and operation of the spectroscopy system with respect to a production system, or other experimental system that generates a fluid sample to be measured may be limited. Moreover, even with remote placement of a UV/visible photospectrometer system, the collection of data for each measurement for a given path length L may be such that the overall measurement time is extensive in order to measure changes in absorbance over multiple path lengths. With respect to these and other considerations, the present disclosure is provided.

SUMMARY OF THE DISCLOSURE

In one embodiment, a compact light source for coupling to a movable optic probe is provided. The compact light source may include a light emitting diode (LED), to generate a probe signal at a first bandwidth; an optic coupler, disposed adjacent to the LED, and arranged to couple the probe signal into the movable probe; and a narrow bandpass filter disposed to receive the probe signal at the first bandwidth, and to output the probe signal into the movable probe at a second bandwidth, less than the first bandwidth.

In another embodiment, a measurement apparatus is provided a compact light source, comprising a light emitting diode (LED), to generate a probe signal; and a measurement instrument, to receive the probe signal. The measurement instrument may include a sample vessel to contain a fluid sample, the sample vessel comprising a vessel wall. The measurement apparatus may also include a probe, arranged to direct the probe signal through the sample vessel, wherein the probe is movable along a probe direction with respect to the vessel wall, so as to reduce a path length of the probe signal through the fluid sample, and a detector, disposed to receive the probe signal after passing through the vessel wall.

In another embodiment, a system to measure a concentration of a material in a fluid sample is provided. The system may include a compact light source, comprising a light emitting diode (LED), to generate a probe signal, and a measurement instrument, to receive the probe signal. The measurement instrument may include a sample vessel to contain a fluid sample, where the sample vessel chamber has a vessel wall. The measurement instrument may further include a probe, having a probe tip, arranged to direct the probe signal through the sample vessel, wherein the probe is movable along a probe direction with respect to the vessel wall, so as to reduce a path length of the probe signal through the fluid sample; and a detector, disposed to receive the probe signal after passing through the vessel wall.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

The present embodiments present novel approaches to variable path length spectroscopy, including compact light source apparatus, and related measurement systems. In particular, these embodiments may be based upon absorption spectroscopy, where changes in absorbance are used to determine a concentration of a material in a fluid sample.

According to embodiments of the disclosure, a compact light source is provided to be coupled to a variable-path-length-measurement (VPT) apparatus. The compact light source and VPT apparatus together provide a flexible absorption spectroscopy apparatus that can be readily integrated into a variety of production, research and measurement systems, including chromatography protein systems purification systems, filtration systems, and other fluid processing systems. In particular, the compact light source apparatus in the present embodiments may entail a size of approximately 4 inches by 1.5 inches by 1.5 inches according to one non-limiting embodiment. The overall system size including compact light source and VPT apparatus may be approximately 12" by 12" by 6" in one non-limiting embodiment.

Figures 1A, 1B:
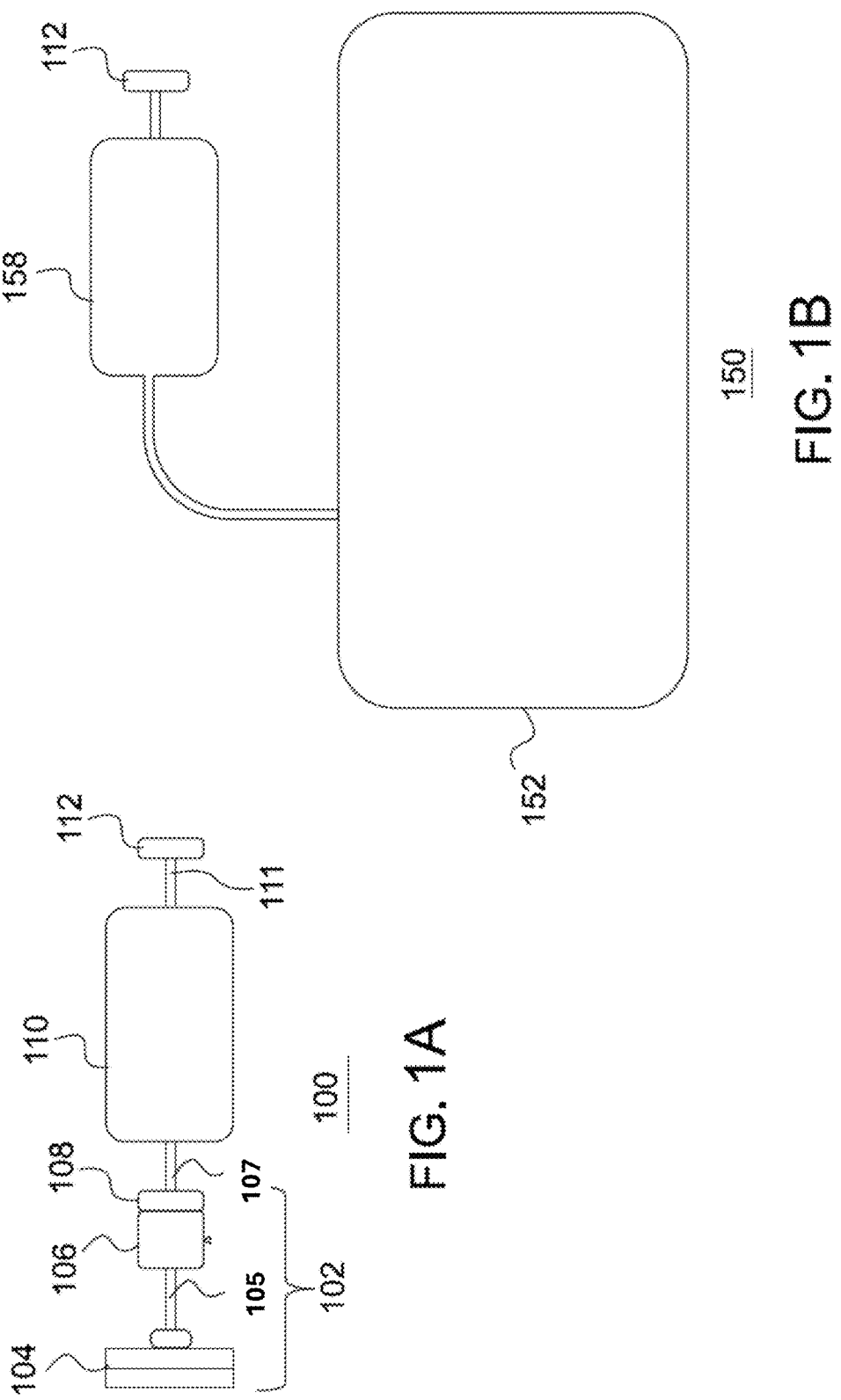
FIG. 1A depicts general features of an absorption spectroscopy system, in accordance with embodiments of the disclosure.
FIG. 1B depicts a reference absorption spectroscopy apparatus.

FIG. 1A depicts an absorption spectroscopy apparatus, shown as system 100, in accordance with embodiments of the disclosure. The system 100 may include a compact light source 102, and a measurement instrument 110, coupled to the compact light source 102, and a detector 112, disposed next to the measurement instrument 110.

The compact light source 102 may include a light emitting diode (LED) 104, an optic coupler 106, disposed adjacent to the LED 104, and a narrow bandpass filter 108, disposed adjacent to the optic coupler 106. According to embodiments of the disclosure, LED 104 may represent a single LED or an array of LEDs that emit radiation at a single wavelength. In other embodiments, a plurality of LEDs may be provided, where a given LED emits radiation at a wavelength that differs from the wavelength of another LED.

As in known LEDs, the LED 104 may emit radiation whose intensity as a function of wavelength is characterized by a single peak, which peak may be associated with a given type of LED, such as a 272 nm LED, a 310 nm LED, and so forth. According to different embodiments of the disclosure, the LED 104 may emit unfiltered radiation 105, having a peak whose bandwidth or halfwidth is between 10 nm and 50 nm. In accordance with embodiments of the disclosure, when the unfiltered radiation 105 from LED 104 passes through narrow bandpass filter 108, the bandwidth of the filtered radiation 107 may be reduced to less than 1 nm, essentially being monochromatic radiation. As such, the compact light source 102 may be termed a monochromatic light source. In various embodiments of the disclosure, the filtered radiation may have a peak wavelength in a range of ultraviolet (UV) to infrared (IR) wavelengths, and more particularly, between 250 nm to 1000 nm, and may have a bandwidth of less than 1 nm after exiting the compact light source 102.

In operation, the filtered radiation 107 may be conducted through the measurement instrument 110, emerging as attenuated radiation 111, which radiation is detected by the detector 112. Though shown separately in FIG. 1A, according to some embodiments, the detector 112 may form part of the measurement instrument 110. The operation of the measurement instrument 110 or variants thereof is detailed below.

However, in brief, the measurement instrument 110 employs a movable optical probe (not separately shown) to vary the path length L of the filtered radiation 107 that is transmitted through a given fluid sample (not shown) that is present in the measurement instrument 110. The detector 112 is arranged to detect intensity of the radiation transmitted through the given fluid sample, which radiation is shown as attenuated radiation 111. In accordance with Beer Lambert law, the concentration C of a material in a sample may be determined as $A/eL$, where A is the absorbance and e is the molar absorptivity. In turn, A is determined as $\log_{10}(I_0/I)$, where $I_0$ is the intensity of the filtered radiation 107, and I is the intensity of the attenuated radiation 111. Because the intensity of the attenuated radiation 111 will vary according to changes in path length L, the change in I as a function of path length L change can be used to directly determine the change in absorbance A as a function of change in path length L. For example, assuming that changes in $I_0$ can be neglected between an intensity measurement $(I_1)$ at a first path length $L_1$ and an intensity measurement $(I_2)$ at a second path length $L_2$, DA can be determined directly as $\log I_1 - \log I_2$. In turn, from Beer Lambert law, DA/DL is equal to eC, where DL or the absolute value thereof is equal to $L_1 - L_2$. Thus, the system 100 may be employed to readily determine the concentration C of a material in a fluid sample, by varying the path length (to determine DL) of the filtered radiation 107 as the radiation passes through measurement instrument 110, and detecting changes in intensity of the attenuated radiation 111 (to determine DA).

Note that according to embodiments of the disclosure, where the bandwidth of the filtered radiation 107 is less than 1 nm, the system 100 may determine the concentration of a sample in measurement instrument 110 at a sufficiently narrow wavelength range to be deemed a single wavelength, or monochromatic radiation.

By way of highlighting advantages of the system of FIG. 1A, FIG. 1B depicts a reference absorption spectroscopy apparatus, shown as system 150. The system 150 includes a known light source, where the light source 152 may be termed a UV/visible spectrophotometer. The light source 152 may generate radiation over a range of wavelengths extending from the near ultraviolet through the visible wavelength range. The radiation may be guided through an optical fiber or similar structure to a measurement apparatus 158. In some embodiments, the measurement apparatus 158 may operate to vary the path length L of radiation from light source 152 that is transmitted through a fluid sample in the measurement apparatus 158. For each path length L, a absorption spectrum may be collected over a range of wavelengths, such as between 200 nm and 700 nm, or any suitable wavelength. Again, a concentration C may be determined by determining changes in absorbance. However, the collection of intensity information at the detector 112 for a given path length L may entail a much longer duration over the spectral range of 200 nm to 700 nm, as compared to the detection of intensity of monochromatic radiation for the system 100. For example, collection of an absorption spectrum in the apparatus of FIG. 1B may be performed by continuously scanning a grating to generate different light wavelengths that are conducted through a fluid sample as a function of time. As an example, an absorbance measurement using an apparatus as shown in FIG. 1B may require 20 seconds or so.

The present inventors have appreciated that for the purposes of measuring the concentration of a material of interest, in many instances, the measurement of changes in intensity of the absorbance of a fluid sample containing the material of interest need be conducted just over a narrow spectral range, using essentially monochromatic radiation. As such, the system 100 of FIG. 1A, by virtue of employing an LED as a light source, may collect absorbance data nearly instantaneously after triggering the LED, while the duration required to acquire each new absorbance measurement at a new path length L is limited just to the time required to adjust the path length L of the radiation. Moreover, by virtue of having a compact size, the system 100 may provide advantages in terms of flexibility of integration into processing systems including chromatography systems, protein purification systems, filtration systems, and other fluid processing systems, as previously noted.

Figures 2, 3:
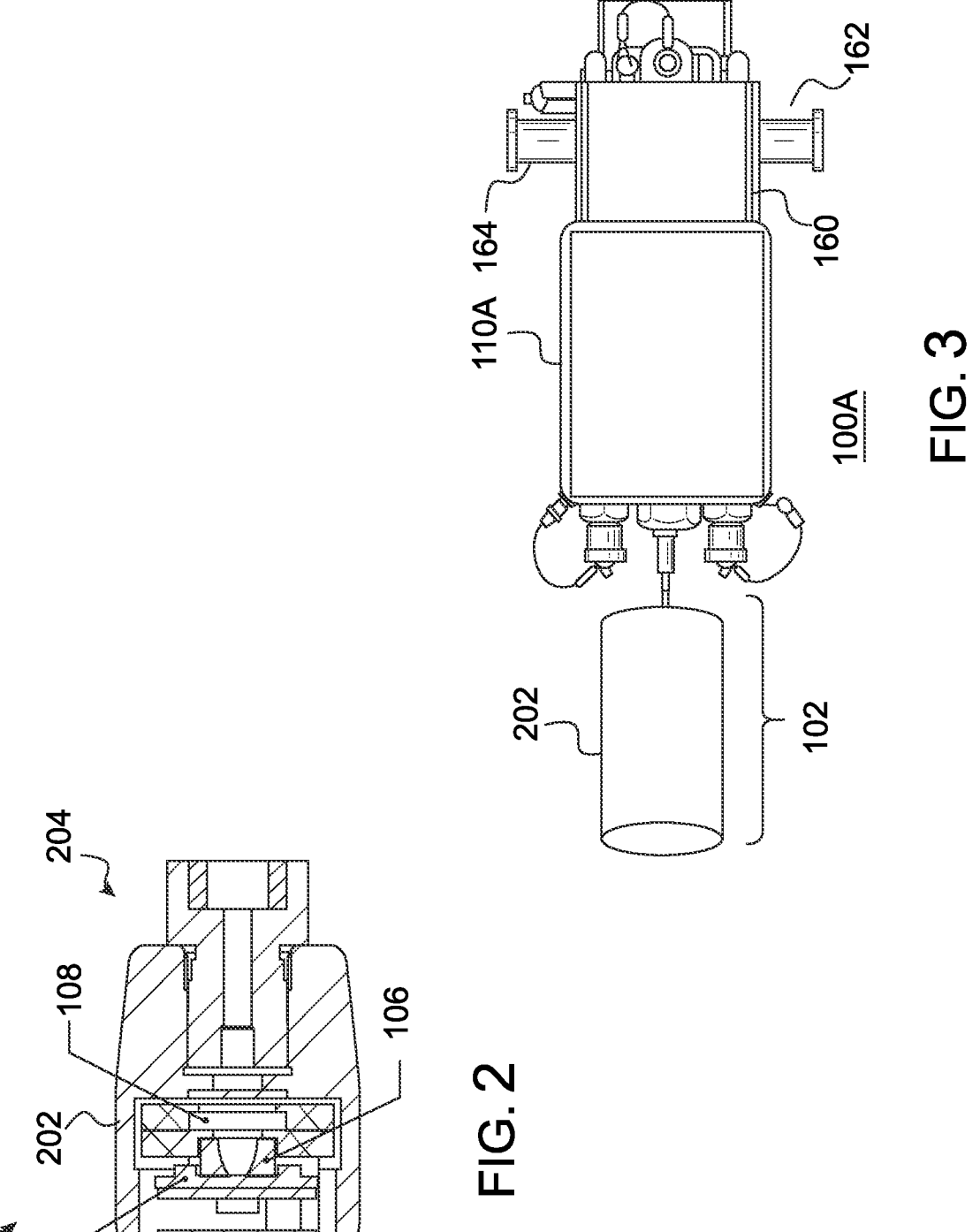
FIG. 2 depicts a side cross-sectional view of a compact light source, in accordance with embodiments of the disclosure.
FIG. 3 depicts one variant of the system of FIG. 1.

FIG. 2 depicts a side cross-sectional view of a compact light source, in accordance with embodiments of the disclosure. The compact light source 102A may be a variant of the compact light source 102, described above. In this embodiment, the compact light source 102A includes a housing 202 that includes the LED 104, the optic coupler 106, and the narrow bandpass filter 108.

The compact light source 102A may also include a connector 204, to reversibly couple to a measurement instrument, such as measurement instrument 110. In particular, the connector 204 functions as an adapter configured to reversibly couple the light source 102A to a movable optic probe, discussed further below. According to some embodiments, the compact light source 102A may represent one light source of a set of similar light sources, that are interchangeable to connect to a measurement instrument 110. Each light source of the set of light sources may include an LED configured to emit radiation at a chosen wavelength. Thus, the compact light source 102A may represent a 272 nm light source, a 280 nm light source, a 310 nm light source, and so on, according to non-limiting embodiments of the disclosure. In this manner, the compact light source 102A may be readily interchangeable so as to tailor the wavelength of filtered radiation 107 according to a given application. Thus, for probing the absorbance of a first material, a 272 nm wavelength radiation source may be appropriate, while for probing absorbance of a second material, a 310 nm wavelength radiation source may be appropriate. Of course, the characteristics of the narrow bandpass filter 108 may also be tailored in tandem with the choice of wavelength for LED 104.

FIG. 3 depicts one variant of the system of FIG. 1. The system 100A includes a compact light source 102 and a measurement apparatus 110A, connected to the compact light source 102. In some embodiments, the compact light source 102 may be configured as in FIG. 2, where a housing 202 contains an LED, optical coupler, narrow bandpass filter, and connector. As such, the compact light source 102 may be reversibly connected and disconnected from the measurement apparatus 110A.

Figure 4:
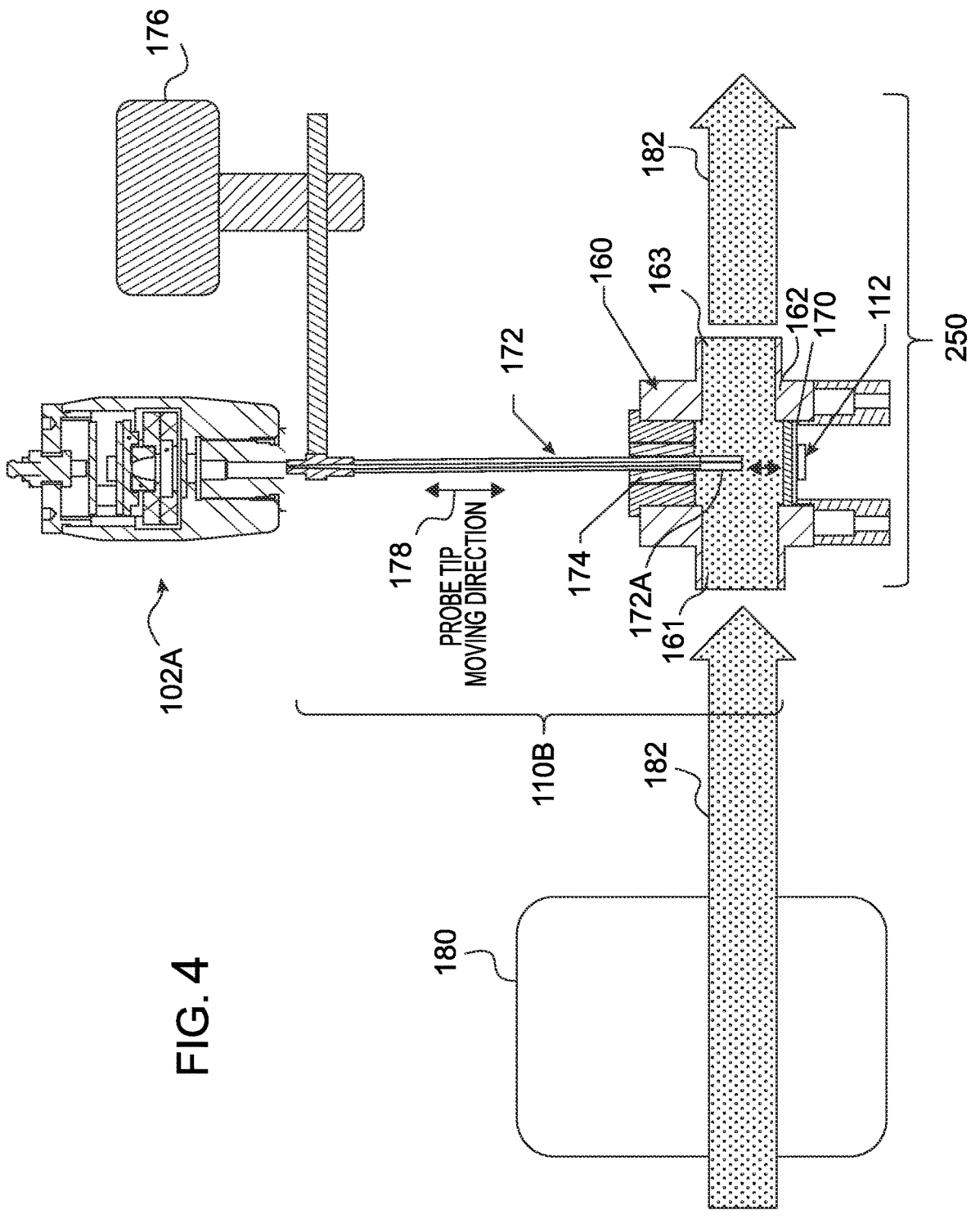
FIG. 4 depicts another measurement system, according to embodiments of the disclosure.

The measurement apparatus 110A may include a movable optic probe, where operation of movable optic probe is detailed with respect to FIG. 4 to follow. The measurement apparatus 110A may include a sample vessel 160, an inlet port 161 to admit a fluid sample, and an outlet port 163 to conduct the fluid sample out of the sample chamber vessel 160. As such, the measurement apparatus 110A may be used to couple to a processing system (not separately shown) to provide dynamic measurements of a concentration C of a material in a sample fluid, as the sample fluid passes through the measurement instrument 110A.

FIG. 4 depicts another measurement system, shown as measurement system 250, according to further embodiments of the disclosure. The measurement system 250 is depicted as coupled to an external processing system, represented as processing system 180. As such, the processing system 180 may represent any suitable system generating a fluid sample to be measured, such as a chromatography system, a protein purification system, a filtration systems, or other fluid processing system, as previously noted. The measurement system includes a measurement instrument 110B, as well as a compact light source 102A, coupled to the measurement apparatus, and a drive component 176. The drive component 176 may be considered part of the measurement instrument 110B according to some embodiments.

In the scenario of FIG. 4, the processing system 180 is depicted as generating a fluid sample 182 that is conducted through the measurement instrument 110B, in order to measure a concentration C of a material in the fluid sample 182. In operation, the compact light source 102A will emit radiation from an LED chosen to emit radiation at a target wavelength, suitable for measuring material in the fluid sample 182. The radiation may be provided as monochromatic radiation as a consequence of passing through a narrow bandpass filter in the compact light source 102A, as discussed above. The radiation is directed along a probe axis 178 into and through a movable probe 172. The movable probe 172 may be formed of a single optical fiber or of multiple fibers, suitable to transmit radiation over the appropriate wavelength range, as generated by the compact light source 102A. These fibers may be of different diameters depending on the utilization of the measurement instrument 110B. In various non-limiting embodiments the fiber diameter is in the range of from about 0.005 mm to about 20.0 mm. The movable probe 172 may be fused silica, glass, plastic or any transmissible material appropriate for the wavelength range of the compact light source 102A and detector 112. After passing through the window 170, the radiation is detected using detector 112, where suitable examples of the detector 112 include a photomultiplier tube, a photodiode, an avalanche photodiodes, a charge-coupled device (CCD), and intensified CCDs, among others.

The movable probe 172 in particular is translatable along the probe axis 178, so as to move within a sample vessel 160. As shown in FIG. 4, the movable probe may be translated with respect to a vessel wall 162 of the sample vessel 160, so as to change the path length L of the radiation. In particular, the path length L represents the distance between the probe tip 172A and a lower portion of the vessel wall 162. As such, the value of L corresponds to the distance that the radiation may travel through the fluid sample 182, when the fluid sample is disposed in the sample vessel 160.

According to various embodiments of the disclosure, a transparent window, shown as window 170, may be provided opposite to the probe tip 172A. The window 170 may, for example, form a part of the lower portion of the vessel wall 162, and may be suitable to transmit wavelengths within the range of the measurement instrument 110B, such as from 200 nm to 1100 nm. For example, a quartz window may be called for in embodiments where the wavelength of the radiation is in the ultraviolet range. In various non-limiting embodiments where the sample vessel 160 is coupled to external fluid lines of a processing system or apparatus, the volume of fluid sample within the sample vessel 160 may range between the microliter to many milliliter range, while the path length L may be variable between 0 cm and several cm.

To facilitate concentration measurements using the approach where DA/DL is equal to eC, the drive component 176 may be a motor that translates the probe tip 172A along the probe axis 178. The drive component 176 may provide continuous motion or may be set to vary the path length L in precise steps. In various non-limiting embodiments, suitable examples of the drive component 176 include stepper motors, servo, piezo, electric and magnetic motors or any device that can be controlled to provide a variable path length L through a sample. While the drive component 176 may be coupled to translate the movable probe 172 with respect to the sample vessel 160, in some embodiments, the drive component 176 may drive a stage on which the sample vessel 160 rests so that the probe tip 172A moves relative to the sample vessel 160. In some embodiments of incremental or step-like motion, the movable probe 172 is moved relative to the sample vessel 160 in increments ranging from 0.2 $\mu$m to 1 cm, and more particularly in increments ranging from 1 $\mu$m to 50 $\mu$m.

Note that the FIG. 4 depicts an embodiment of the measurement instrument 110B in a "vertical orientation", where the sample vessel 160 is disposed above the detector 112 and the probe tip 172A can move up and down, into and out of the sample vessel 160. such that radiation exiting from the probe tip 172A moves through the fluid sample 182 within the sample vessel 160 and impinges on the detector 112, disposed below. In further embodiments, other orientations are possible such as in a glow-cell system where the detector and probe tip are in a substantially horizontal orientation with respect to one another and the probe axis lies along the horizontal. Regardless of the absolute spatial orientation or the movable probe 172 and detector 112, according to various embodiments of the disclosure, the probe axis will generally extend perpendicularly relative to the main plane of the detector 112.

Advantages afforded by the aforementioned embodiments include the ability to provide a higher quality of light to a sample being measured, as compared to a system based upon a known broadband spectrophotometer. The improved quality includes a more stable light source and narrower half width for a given radiation. The monochromatic light source of the present embodiments may achieve better spectral resolution than broad band spectrometers while maintaining a much smaller form factor, making such a light source apparatus particularly useful for applications where just a few selected wavelengths are being used day by day.

Additionally, the size reduction and environmental design requirements (IP65+/Chemical Compatibility) is unique to this type of apparatus allowing such apparatus to be placed into GMP manufacturing environments, where such placement would not be practical for traditional broad band spectrophotometers.

Figure 5:
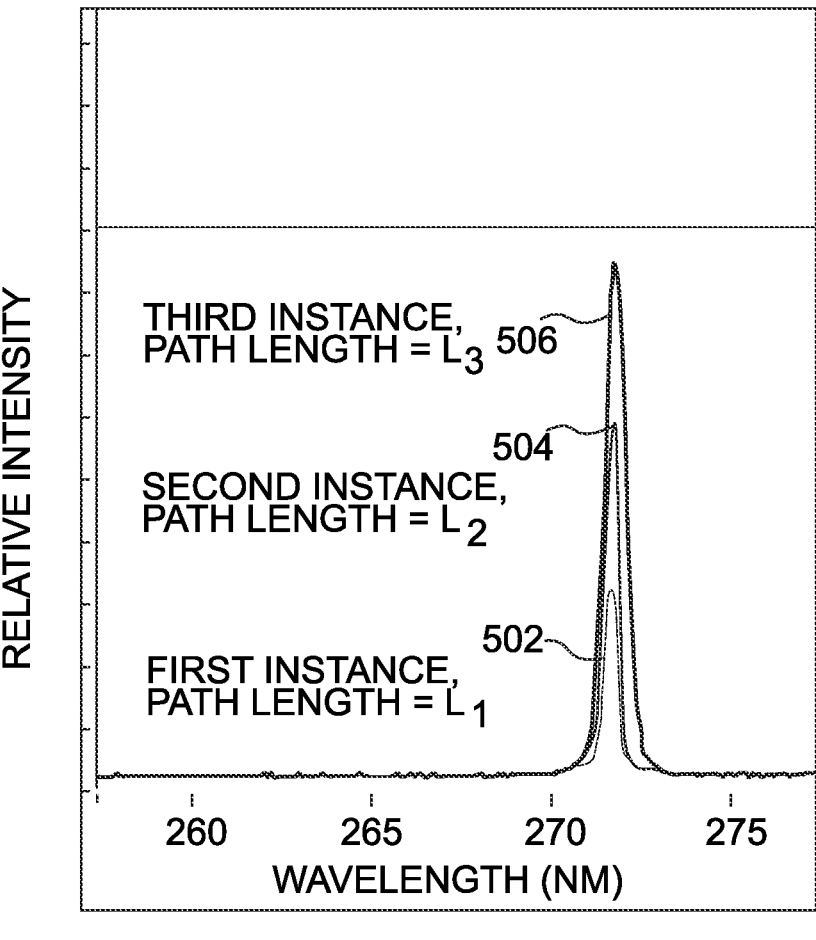
FIG. 5 depicts exemplary absorption spectra, according to embodiments of the disclosure.

FIG. 5 depicts exemplary absorption spectra, according to embodiments of the disclosure. In this example, the graph of FIG. 5 depicts detected radiation intensity as a function of wavelength in the near UV range. Three spectra, a spectrum shown as curve 502, a spectrum shown as curve 504, and a spectrum shown as curve 506, are shown, each composed of a single monochromatic peak illustrating the detected intensity of UV light emitted from a monochromatic source, emitting at 272 nm.

According to various embodiments of the disclosure, and consistent with the aforementioned embodiments, the peak may have a half width of less than 1 nm. The spectra represent data collected after radiation is emitted from a UV LED source and is passed through a narrow bandpass filter. As such, the spectrum 502 presents data collected at a first instance when the path length of the multi-monochromatic radiation is directed through a probe that is disposed at a first position, defining a path length $L_1$ through a fluid sample. Likewise, the curve 504 presents data collected at a second instance when the path length of the multi-monochromatic radiation is directed through a probe that is disposed at a second position, defining a path length $L_2$ through the fluid sample, while the curve 506 presents data collected at a third instance when the path length of the multi-monochromatic radiation is directed through a probe that is disposed at a third position, defining a path length $L_3$ through the fluid sample. Given that, as noted above, the concentration C will equal DA/(DLe), the determination of the difference in absorbance between curve 504 and spectrum 502 (DA) will lead directly to C, because DL is given by $L_2$–$L_1$. Moreover, the determination of the difference in absorbance between curve 506 and curve 504 (DA) will also lead directly to C, because DL is given by $L_3$–$L_2$.

Note that the intensity of the 272 nm peak corresponds essentially to the intensity I, as discussed above, and the rate of increase in the intensity of the 272 nm peak with change in the value of L is proportional to the change in absorbance DA/DL, or slope coefficient m. Accordingly, in one instance, the value of DA/DL or m may be determined by measurement of the difference in I (curve 504–curve 502) and L between the first instance and the second instance. Likewise, the value of m may be determined by measurement of the difference in I (curve 506–curve 504).

In summary, by providing a compact monochromatic light source in conjunction with a VPT apparatus, the present embodiments proved a novel and useful alternative to known broadband spectrometer based systems, especially for certain applications. While measurements performed using broadband light scans may provide the user all information required to analyze a sample, such measurements come at the expense of increased data acquisition time and data analysis time. By providing a discrete wavelength for analysis, the present embodiments allow the user to obtain just the information needed and nothing that is extraneous. This focus on a single discrete wavelength decreases acquisition time allowing the user to make real-time process decisions to ensure the quality of the product being measured.

While the present arrangement has been disclosed with reference to certain embodiments, numerous modifications, alterations and changes to the described embodiments are possible without departing from the spirit and scope of the disclosed arrangement, as defined in the appended claims. Accordingly, it is intended that the present arrangement not be limited to the described embodiments, but that it has the full scope defined by the language of the following claims, and equivalents thereof.

The invention claimed is:

1. A compact light source for coupling to a movable probe, comprising:
   a light emitting diode (LED), to generate a probe signal at a first bandwidth;
   an optic coupler, disposed adjacent to the LED, and arranged to couple the probe signal into the movable probe; and
   a narrow bandpass filter disposed to receive the probe signal at the first bandwidth, and to output the probe signal into the movable probe at a second bandwidth, less than the first bandwidth,
   wherein the LED, the optic coupler, and the narrow bandpass filter form a monochromatic light source.

2. The compact light source of claim 1, wherein the first bandwidth is at least 10 nm, and wherein the second bandwidth is less than 1 nm.

3. The compact light source of claim 1, further comprising a housing, to contain the LED, the optic coupler, and the narrow bandpass filter.

4. The compact light source of claim 3, further comprising a connector to reversibly couple to the movable optic probe.

5. The compact light source of claim 1, the probe signal comprising a monochromatic signal characterized by a wavelength in a range of ultraviolet (UV) to infrared (IR) wavelengths, and having a bandwidth of less than 1 nm after exiting the compact light source.

6. A measurement apparatus, comprising:
   a compact light source, comprising a light emitting diode (LED) to generate a probe signal; the compact light source further comprising an optic coupler disposed adjacent to the LED, and a narrow bandpass filter disposed to receive the probe signal at a first bandwidth, and to output the probe signal at a second bandwidth, less than the first bandwidth; and
   a measurement instrument, to receive the probe signal, the measurement instrument comprising:
      a sample vessel to contain a fluid sample, the sample vessel comprising a vessel wall;
      a probe, arranged to direct the probe signal through the sample vessel, wherein the probe is movable along a probe direction with respect to the vessel wall, so as to reduce a path length of the probe signal through the fluid sample; and a detector, disposed to receive the probe signal after passing through the vessel wall,
   wherein the LED, the optic coupler, and the narrow bandpass filter form a monochromatic light source.

7. The measurement apparatus of claim 6, wherein the second bandwidth is less than 1 nm.

8. The measurement apparatus of claim 6, wherein the LED, the optic coupler, and the narrow bandpass filter are disposed within a common housing.

9. The measurement apparatus of claim 8, wherein the compact light source is reversibly attachable and detachable with respect to the measurement instrument.

10. The measurement apparatus of claim 6, wherein the measurement instrument is arranged to conduct the fluid sample through the sample vessel.

11. The measurement apparatus of claim 6, the probe signal comprising a monochromatic signal characterized by a wavelength in a range of ultraviolet (UV) to infrared (IR) wavelengths, and having a bandwidth of less than 1 nm after exiting the compact light source.

12. A system to measure a concentration of a material in a fluid sample, comprising:
   a compact light source, comprising a light emitting diode (LED), to generate a probe signal, an optic coupler, disposed adjacent to the LED; and a narrow bandpass filter disposed to receive the probe signal at a first bandwidth, and to output the probe signal at a second bandwidth, less than the first bandwidth;
   a measurement instrument, to receive the probe signal, the measurement instrument comprising:
      a sample vessel to contain a fluid sample, the sample vessel comprising a vessel wall;
      a probe, having a probe tip, arranged to direct the probe signal through the sample vessel, wherein the probe is movable along a probe direction with respect to the vessel wall, so as to reduce a path length of the probe signal through the fluid sample; and
   a detector, disposed to receive the probe signal after passing through the vessel wall,
   wherein the LED, the optic coupler, and the narrow bandpass filter form a monochromatic light source.

13. The system of claim 12, the probe signal comprising a monochromatic signal characterized by a wavelength in a range of ultraviolet (UV) to infrared (IR) wavelengths, and having a bandwidth of less than 1 nm after exiting the compact light source.

14. The system of claim 12, wherein the LED, the optic coupler, and the narrow bandpass filter are disposed within a common housing.

15. The system of claim 12, wherein the compact light source is reversibly attachable and detachable with respect to the measurement instrument.

16. The system of claim 12, wherein the measurement instrument is arranged to conduct the fluid sample through the sample vessel.

17. The system of claim 12, the sample vessel further comprising:
   an inlet port to admit the fluid sample;
   an outlet port to conduct the fluid sample out of the sample chamber vessel; and
   a transparent window disposed between the probe tip and the detector.

* * * * *